(12) United States Patent
Sutter

(10) Patent No.: US 6,294,054 B1
(45) Date of Patent: Sep. 25, 2001

(54) WATER PURIFICATION SYSTEM

(76) Inventor: Douglas E. Sutter, 508 Eighth Ave., Menlo Park, CA (US) 94025

( * ) Notice: Subject to any disclaimer, the term of this patent is extended or adjusted under 35 U.S.C. 154(b) by 0 days.

(21) Appl. No.: 09/241,949

(22) Filed: Feb. 2, 1999

(51) Int. Cl.[7] .................................. B01D 3/10; C02F 1/04
(52) U.S. Cl. ........................... 202/176; 202/205; 203/25; 203/DIG. 14; 203/11; 203/22; 203/DIG. 8
(58) Field of Search ...................... 203/10, 11, DIG. 14, 203/91, 25, 2.22, DIG. 8; 202/205, 233, 176, 160; 159/DIG. 16, DIG. 40; 119/16.1, 29, 23

(56) References Cited

U.S. PATENT DOCUMENTS

| | | | |
|---|---|---|---|
| 2,105,935 | * | 1/1938 | Swanson .................................. 196/73 |
| 3,505,176 | * | 4/1970 | Buchsbaum et al. .................. 203/73 |
| 5,614,066 | * | 3/1997 | Williamson ........................... 202/205 |
| 5,935,388 | * | 8/1999 | Meszaros ............................. 202/182 |

FOREIGN PATENT DOCUMENTS

| | | | |
|---|---|---|---|
| 0634198 | * | 1/1995 | (EP) . |
| 3296801 | * | 12/1988 | (JP) . |
| 2048156 | * | 11/1995 | (RU) . |
| 2050168 | * | 12/1995 | (RU) . |
| 2094070 | * | 2/1998 | (RU) . |
| 1081197 | * | 3/1984 | (SU) . |
| 96-05900 | * | 2/1996 | (WO) . |
| 9616711 | * | 6/1996 | (WO) . |

* cited by examiner

Primary Examiner—Virginia Manoharan

(57) ABSTRACT

A compact distilled water system for home, marine, and laboratory use which includes a closed circuit that provides high pressure water for dispensing water to remote locations and that also creates, in conjunction with an eductor, a partial vacuum in the evaporator tank to permit boiling and steam generation therein below atmospheric pressure.

3 Claims, 3 Drawing Sheets

Figure 1:
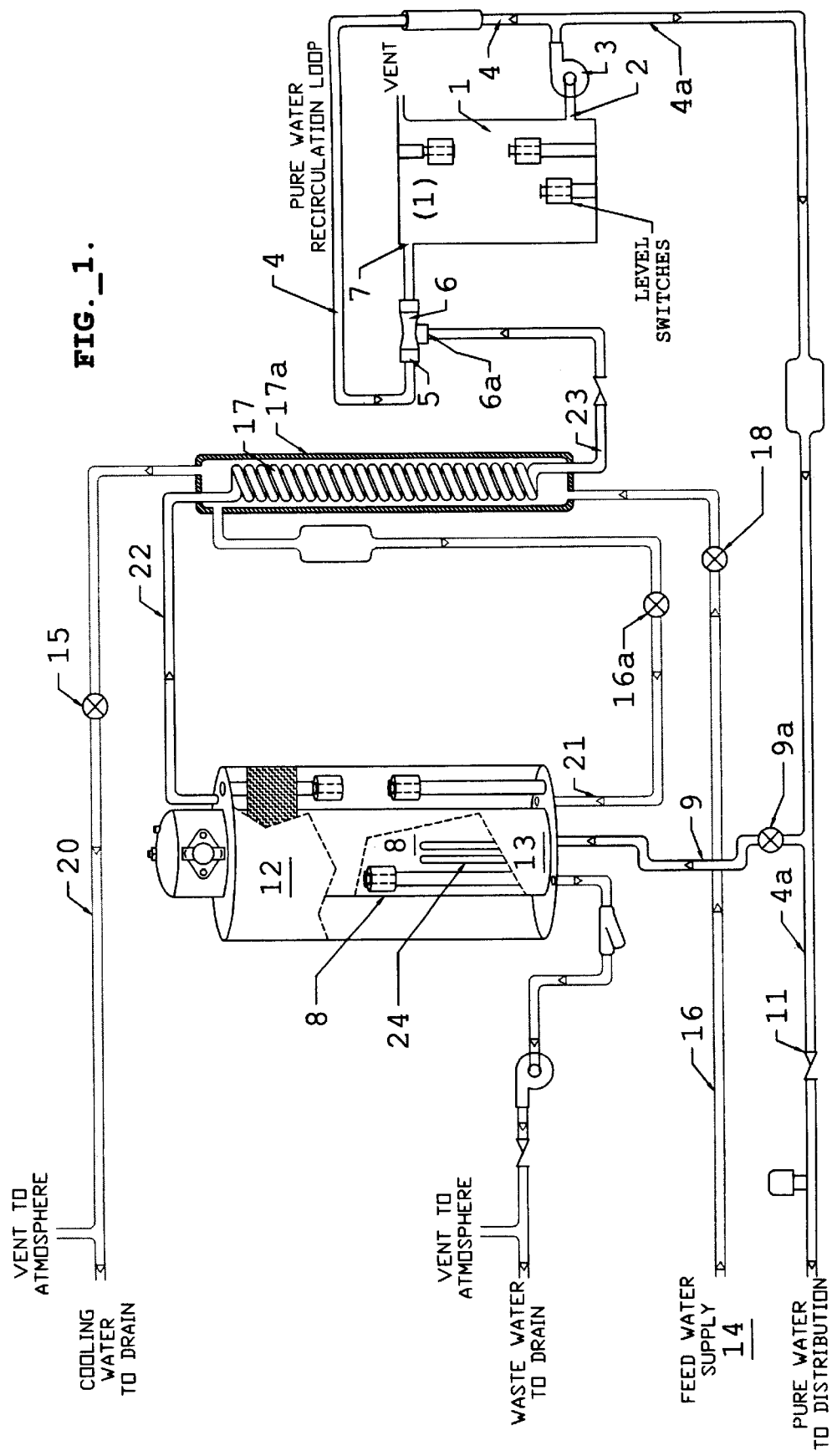

FIG._2.

WATER PURIFICATION SYSTEM

This invention relates to a new and improved water distillation unit, which includes a closed distilled water circulation system that functions to produce water under pressure to dispensing lines, while also in combination with an eductor creates a partial vacuum in the evaporator tank to permit water to be boiled and steam generated below atmospheric pressure.

BACKGROUND AND SUMMARY OF THE INVENTION

The present invention is particularly designed for use as a compact, automatic purified water distillation unit of the type especially adapted for home use to produce 4–6 gallons, more or less, drinking water per day for an average sized family. The unit is also especially adapted for relatively small office use to take the place of bottled water stands as may be found in many offices as well as residential homes.

The unit embodying the present invention may be designed for home installation under a conventional kitchen sink, along with required utility connections including electrical, feed water supply, and waste water drainage. The unit may be plumbed to supply the distilled water to a dedicated faucet installed faucet at the sink, and also to supply distilled water to the inlet of an ice-making machine such as located in the freezer department of a conventional refrigerator, or the like.

In addition to home installations, a unit embodying the invention is extremely well suited for desalination of sea water in marine applications and/or purification of any water in industrial as well as other applications outside the home. Depending on distilled water needs in terms of volume, a unit embodying this invention may be scaled up or down to produce anywhere from a few gallons a day to thousands of gallons per hour.

Numerous functional advantages are obtainable using the present distillation system including:

1) The closed circuit component above-mentioned, creates a partial vacuum in the evaporator so that feedwater supplied to said evaporator can be heated to boiling point and converted to steam at below atmospheric boiling point (which at sea level is 212° F.). The boiling of water at lower temperatures prevents scale buildup on the heating elements and heat transfer surfaces installed in the evaporator tank. The building up of scale is perhaps the singularly most inconvenient and annoying part of standard systems where boiling is at atmospheric pressure and at higher temperatures. Scale buildup reduces the efficiency of the heat transfer from the heating elements to the surrounding water and must be cleaned out on a regular basis with acid to prevent massive scale buildup which will stop the distillation process and cause heater failure.

2) A second benefit of operating at lower temperatures is that it allows the use of plastics, rather than more expensive and difficult to work with metals, in various components where feasible.

3) The present unit is both fully automatic and is water cooled (air cooling is optional). Most home size distillers are batch operations, and are not automated. The consumer must monitor the quantity of water in storage, drain the evaporator, refill the evaporator and start the distiller when more water is required. Another negative aspect of more conventional home distillers is that the steam condenser coils are usually air-cooled instead of water-cooled. Thus, all of the heat from the process is air blown into the room to raise the overall room temperature which can be obviously undesirable, especially in hot climatic conditions.

4) An "under the sink" unit embodying the present invention can be produced and marketed at cost competitive with or lower than the cost to a home owner of using bottled water, with its multiple attendant disadvantages of requiring the heavy lifting of full bottles into inverted positions in the water dispensing stand as well as putting up with the clutter and wasted floor space used by the dispenser and full and empty bottles.

Other objects and advantages of the invention will become apparent upon reading the following specification and referring to the accompanying drawings.

BRIEF DESCRIPTION OF THE DRAWINGS

FIG. 1 is a flow diagram and schematic view of a first embodiment of a distilled water unit or system with many of the components labeled with descriptive words and symbols to readily enable a person skilled in the art to readily comprehend the system viewed in its entirety.

FIG. 2 is similar to FIG. 1 of a second embodiment except that a separate heater tank and other features have been eliminated from the system.

FIG. 3 is a third embodiment similar to FIG. 2 showing a different heating source and adaptable for marine and other applications adjacent an internal combustion engine or the like.

DESCRIPTION OF THE INVENTION

Referring more specifically to FIG. 1, particular attention is directed to the major components comprising the distilled water closed circuit which operates under pressure in a manner to be described. Distilled water from the pure water storage tank 1 is withdrawn from its bottom outlet 2 by a circulation pump 3 into a first conduit 4. The distilled water under pressure flowing through conduit 4 is directed into the inlet or high pressure side 5 of an eductor 6. Water pumped through conduit 4 and inlet 5 flows through the eductor and is discharged into the upper inlet side 7 of storage tank 1. Various automatic and conventional water level switches (as designated) are provided in storage tank 1 to maintain desired minimum and maximum levels.

Branch line **4*a* of conduit 4 is operable to pump a portion of the distilled water discharged from storage tank through the circulation pump 3 to one or more destinations, including heating tank 8 via branch line 4*a* and feeder line 9. Line 9 includes solenoid valve 9*a* that regulates the amount of water pumped into the heater tank utilizing standard control systems as designated in FIG. 1**.

A portion of the distilled water pumped flowing through branch line **4*a* may also be diverted through check valve 11** to remotely located distilled water dispensing sources including, for example, a faucet as may be installed on a sink (not shown) and/or to the inlet port of a conventional ice-making machine and chilled water dispenser as may be housed within the standard refrigerator (not shown).

In FIG. 1, distilled water pumped into heater tank 8 is heated by conventional electric immersion heating elements 24 to a predetermined temperature below the atmospheric boiling point and preferably in the range of 120° F. to 210° F. The heating tank is vented to atmosphere. However, because the water is not brought to the atmospheric boiling point, there is no live steam generated in the heating tank to vent into the room. Having the heating element immersed in distilled water and not boiling this water maximizes the heater life as well as providing a source of hot distilled water.

The heating tank 8 is mounted within evaporator tank 12 whereby the common vertical tank wall 13 establishes a surface area for transferring heat from the heated distilled water in tank 8 to the surrounding feed-water which is automatically supplied as needed to the evaporator tank 12. Specifically, evaporator tank 12 is connected to feed-water supply 14 via conduit 16, control valve 18, condenser unit 17, control valve 16a, and conduit 21.

Because the interior of evaporator tank 12 is maintained at a vacuum (by means to be described), feed-water in tank 12, to which heat is transferred from surface 13, will boil within the range of 110° F. to 208° F. whereby pure steam thus generated will outflow through conduit 22, through condenser coil 17 whereby the steam is condensed into pure distilled water by the time it flows into conduit 23 connected to the suction side 6a of eductor 6. As can be seen from the FIG. 1 flow diagram, the condenser coil 17, through which the steam from evaporator tank flows, is water-cooled by the feed-water running through control valve 18, the condenser water jacket 17a, flow restricter 15, and discharged to drain via conduit 20.

Heretofore I have described the overall basic elements of the entire water distillation system. Particular attention is now directed to a novel and key subsystem in the form of a closed circuit comprising the storage tank 1, pump 3 and eductor 6 and their cooperative and functional relationship to each other and to the overall system operation. More specifically, the storage tank 1 serves not only to store a reservoir of distilled water for immediate dispensing, but said tank in cooperation with pump 3 and its related plumbing supplies the feed water to heating tank 8 that in turn becomes the heat source for evaporation tank 12. Pump 3, in cooperation with eductor 6 and storage tank 1 define a closed circuit, whereby water pumped under high pressure through eductor 6 creates the necessary partial vacuum in lines 17, 23, 22, and the evaporator tank 12—thus making it possible to boil the raw feed water at well below atmospheric pressure from heat supplied by the heating tank as above described. Eductor 6, by its very nature, has a high pressure side from the pump, a high velocity constricted mid-section, and a low pressure side to which line 23 is shown connected at 6(a) in the drawings.

It will be apparent that the low pressure water flowing into storage tank 1 will also suck into its stream the additional distilled water from line 23 as produced by steam generated in the evaporator tank and condensed along the way in condenser coils 17—the latter being cooled by raw feed water from Source 16 flowing into water jacket 17a.

From the foregoing description, it will be seen that the circulation pump 3 performs multiple functions. Not only does it supply all, or at least part of, the distilled water under pressure to the heating tank and remote distilled water distribution sources (e.g., faucet, water chiller/ice-maker), but pump 3 also supplies water to the inlet side 5 of the eductor 6 at a high pressure and flow rate, providing sufficient motive to create the necessary partial vacuum within the evaporator tank and condenser lines so that the distilled water storage tank is automatically refilled with distilled water from the newly generated condensed steam from the evaporator tank.

Figure 2:
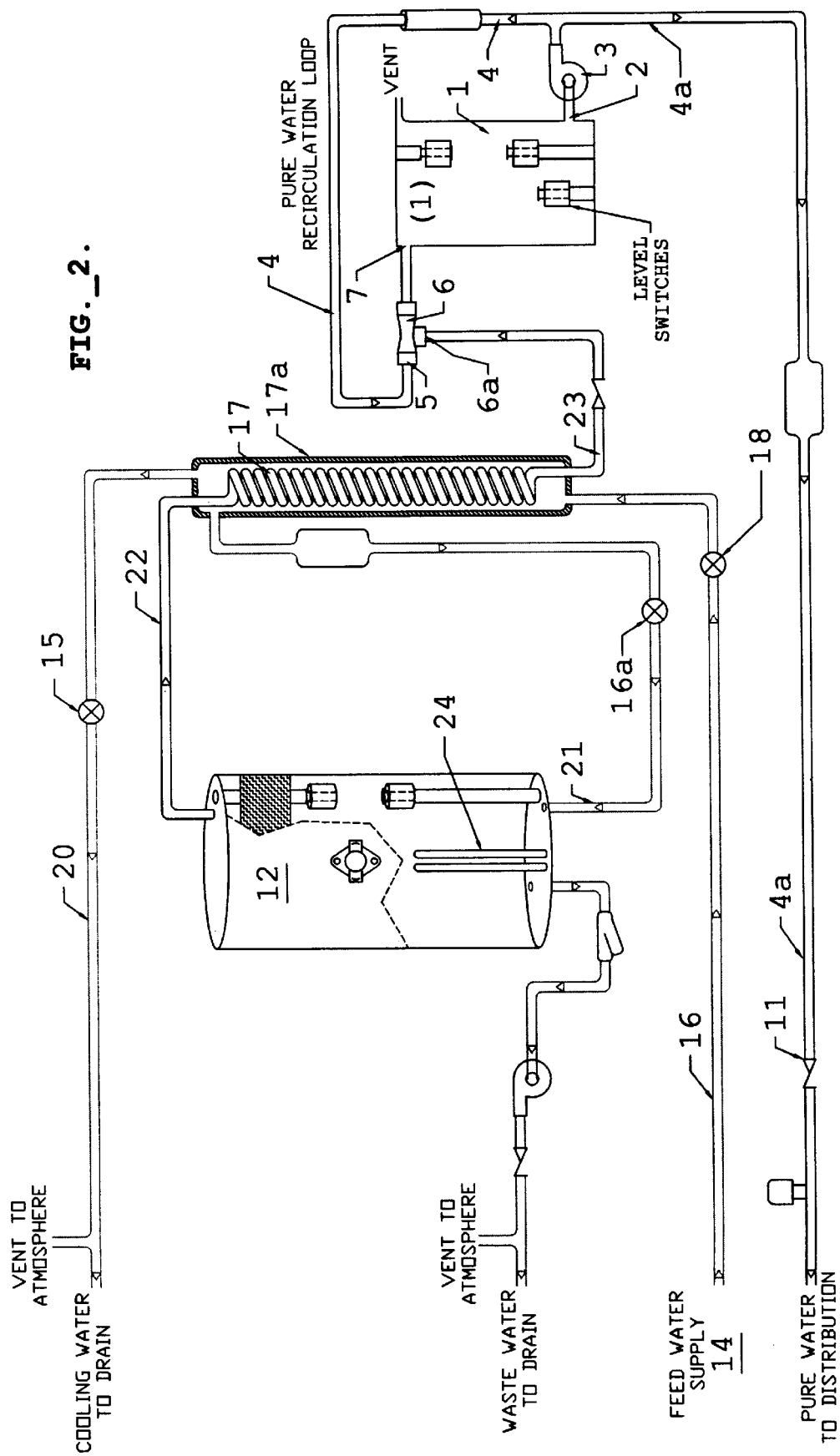

Referring now to FIG. 2 of the drawings, a second and simplified embodiment of the invention is depicted. This embodiment is in all major respects identical in construction and operation to the system shown and above described in reference to FIG. 1, except that the heating tank and evaporator tank are shown as an integral unit instead of two separate elements. The numbering of the same or corresponding parts common to both FIGS. 1 and 2 remain the same.

It is important to note that the same closed circuit component consisting basically of the distilled water storage tank 1, pump 3, and eductor 6 and related plumbing performs the identical multiple functions as heretofore described with reference to the first embodiment.

In particular, and comparing FIG. 1 to FIG. 2, it is noted that the separate heater tank 8 is absent from FIG. 2, and that a conventional heating element 24 is located in the evaporator tank 12 to heat the non-distilled feed water (from supply source 14 via line 21) to a pre-selected temperature range of 110° F.–208° F., for example. The feed water will boil and generate steam at these temperatures, while under partial vacuum as created in the tank by being connected to the low pressure side of the eductor 6 as heretofore explained. As will be obvious from a comparison between FIGS. 1 and 2, because there is no separate heating tank, there is not shown any distilled feed water line 9 as supplied from storage tank 1 appearing in FIG. 1.

Figure 3:
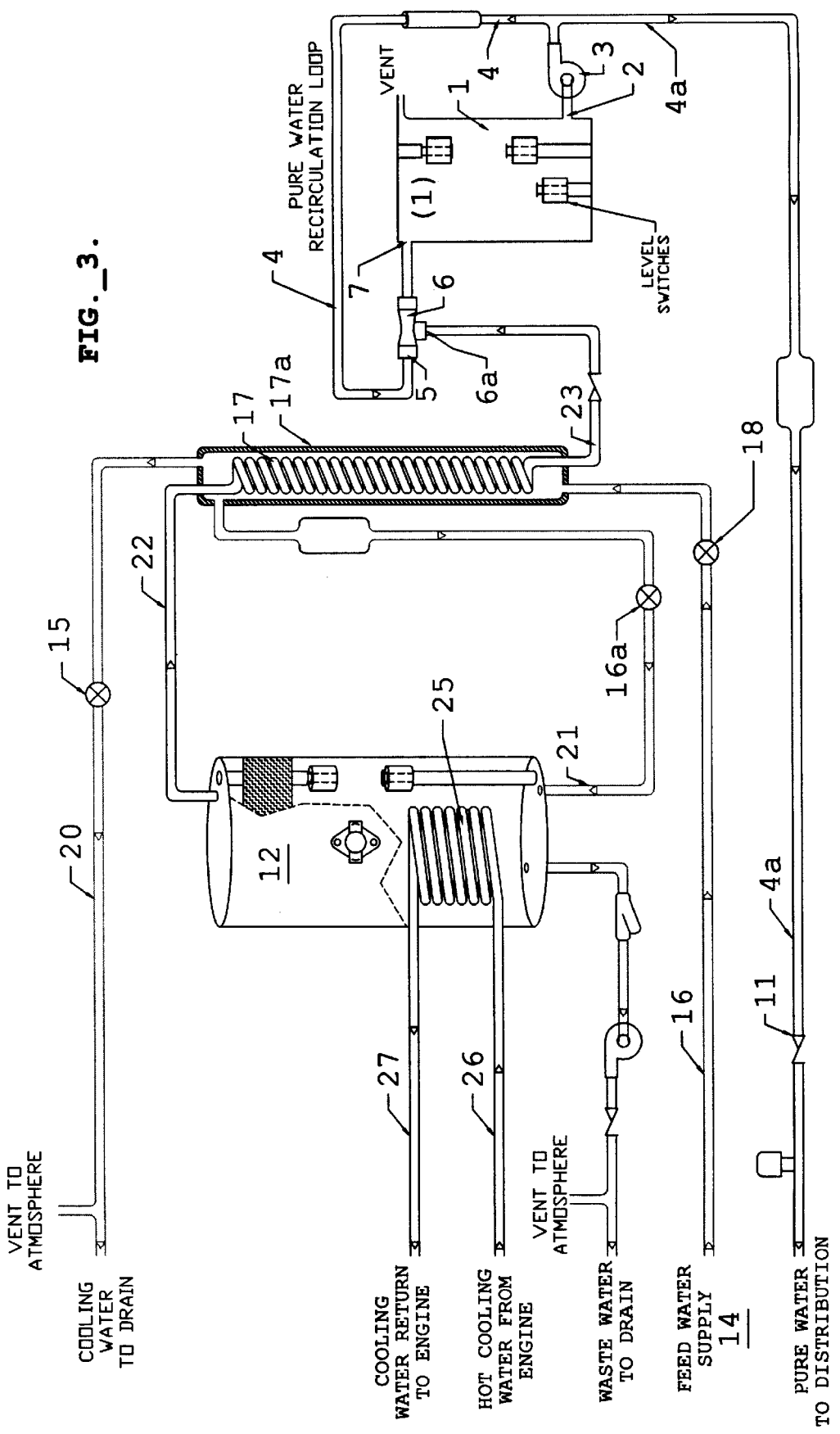

Although in FIG. 2 the heat source is depicted as a conventional electric resistance heater 24, it should be understood that other heat source means may be substituted. For example, a shipboard installation may use the hot cooling water from any onboard internal combustion engine, as specifically shown in FIG. 3. In FIG. 3, the heating element 24 is eliminated altogether, and in its place is substituted a heat exchange coil 25 which is in closed circuit hook-up with the fresh water cooling jacket of most any marine internal combustion engine (not shown). Specifically, conduit 26 shows inflow of hot engine cooling water which circulates through coil 25 and thence through return line 27 in closed circuit communication with the engine water cooling jacket.

The simplified embodiment of FIG. 2 has the advantage over the FIG. 1 unit of a somewhat lower manufacturing cost due to reduction in the number of parts, and the resulting simplified assembly process. The embodiment of FIG. 3 has the advantage over both FIG. 1 and FIG. 2 units in that it requires less than 1 percent of the energy used by the other units because waste heat provides the energy to boil the water.

From a consumers standpoint, the embodiment of FIG. 1 has the advantage over FIGS. 2 and 3 of permitting a direct line connection from distilled water in the separate heating tank directly to a dedicated hot water faucet mounted on the sink usually directly above or closely adjacent installation of the distillation unit. As shown in FIG. 2, the feed water contained in the combined heating and evaporator tank is not distilled, and thus no direct hot water faucet connection to said tank could produce the desired heated distilled water.

Although the invention has been described in some detail by way of illustration and example, it is understood that other changes and modifications may be made without departing from the spirit of the invention or the claims attended hereto.

What is claimed is:

1. A water distillation unit comprising:
   a distilled water storage tank open to atmosphere having an upper inlet and a lower outlet;
   pump means comprising a water pump having an inlet side and a discharge side;

an evaporator tank closed to atmosphere and having a lower feed water inlet, lower waste water outlet and an upper steam outlet;

a heating tank having a lower distilled water inlet and an upper distilled water outlet vented to atmosphere;

means for heating distilled water in said heating tank to a predetermined temperature below the atmospheric boiling point;

heat transfer means for transmitting heat from said heated distilled water in said heating tank to non-distilled feed water in said evaporator tank;

a vacuum source to create a partial vacuum in said evaporator tank sufficient to allow said feed water to boil at below atmospheric pressure from heat supplied through said heat transfer means;

a condenser comprising an inner tube having a steam inlet and a distilled water outlet and an outer tube having a cooling water inlet and a cooling water outlet a first conduit connecting to the discharge side of said pump means for periodically conveying distilled water to the inlet side of said heating tank;

a second conduit in communication with the discharge side of said pump and said upper inlet to said storage tank, an eductor interposed in said second conduit between the discharge side of said pump and the upper inlet of said storage tank;

said eductor defining a venturi having flared ends and a constricted throat with an the inlet side of said venturi receiving pressurized water supplied by said pump means, and a discharge side of said venturi in flow communication with the upper inlet of said storage tank;

a third conduit connecting laterally into a low pressure suction side of said eductor and the distilled water outlet of said condenser;

a high pressure of a distilled water flow through said eductor as generated by said pump means establishing said vacuum source to create a partial vacuum in said third conduit, condenser and said evaporator tank enabling the boiling of feed water in said evaporator tank at below the atmospheric boiling point;

said vacuum source operable to suck steam from said evaporator tank toward and through said condenser and to continue to suck condensed water laterally into the low pressure side of the eductor and thence outwardly toward its discharge end into said second conduit and the upper inlet to said storage tank, whereby said pump means operates to supply pressurized distilled water to said heating tank while also supplying distilled water through said eductor to create said vacuum source to suck steam and newly condensed distilled water therefrom to automatically replace and refill to desired levels distilled water in said water tank.

2. The distillation unit of claim 1 wherein said predetermined temperature to which the water in the heating tank is heated within the approximate range of 120° F. to 210° F., and wherein said heat transfer means is arranged and constructed to transfer sufficient heat to said evaporator tank to bring the water temperature therein within the approximate range of 110° F.–208° F.

3. The distillation unit of claim 1 and wherein a distilled hot water dispensing conduit is connected to the interior of said heating tank below maximum water level to permit transport of said water to a location remote from said heating tank.

* * * * *